United States Patent
Yamauchi et al.

(10) Patent No.: US 9,638,574 B2
(45) Date of Patent: May 2, 2017

(54) MEASUREMENT APPARATUS AND METHOD OF MEASURING SIGNAL LIGHT QUALITY

(71) Applicant: FUJITSU LIMITED, Kawasaki-shi, Kanagawa (JP)

(72) Inventors: Tomohiro Yamauchi, Kawasaki (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 14/687,157

(22) Filed: Apr. 15, 2015

(65) Prior Publication Data

US 2015/0330835 A1 Nov. 19, 2015

(30) Foreign Application Priority Data

May 16, 2014 (JP) ................................. 2014-102516

(51) Int. Cl.
*G01J 1/44* (2006.01)
*G01J 1/04* (2006.01)
*H04B 10/079* (2013.01)

(52) U.S. Cl.
CPC ............. *G01J 1/44* (2013.01); *G01J 1/0488* (2013.01); *H04B 10/07953* (2013.01); *G01J 2001/444* (2013.01)

(58) Field of Classification Search
CPC .................................. G01J 1/44; G01J 1/0488
(Continued)

(56) References Cited

U.S. PATENT DOCUMENTS 6,259,543 B1 * 7/2001 Golovchenko .... H04B 10/0795
398/110
7,756,421 B2 * 7/2010 Roberts .............. H04B 10/2543
398/158
(Continued)

FOREIGN PATENT DOCUMENTS

JP 2002-141868 5/2002
JP 2003-234701 8/2003
(Continued)

OTHER PUBLICATIONS

Dlubek M P, et al., "Method for optical signal-to-noise ratio monitoring based on modulation spectrum assessment" IET Optoelectronics; vol. 3, No. 2; Apr. 6, 2009; pp. 86-92; XP006032697 ISSN: 1751-8776.
(Continued)

*Primary Examiner* — Kevin Pyo
(74) *Attorney, Agent, or Firm* — Fujitsu Patent Center

(57) ABSTRACT

There is provided a measurement apparatus of measuring signal light quality. The measurement apparatus may include: a tunable wavelength filter configured to be input signal lights having different power levels; a measure configured to measure an optical power level of light passing through the tunable wavelength filter; and a controller configured to calculate a non-linear noise component and a spontaneous emission component of a signal light based on the measured optical power levels, the optical power levels being measured at different transmission frequencies for each of the signal lights having the different power levels in response to a control of the transmission frequency of the tunable wavelength filter.

6 Claims, 15 Drawing Sheets

(58) Field of Classification Search
USPC .... 250/214 R, 214 C; 398/26, 136, 158, 208
See application file for complete search history.

(56) References Cited

U.S. PATENT DOCUMENTS

| | | |
|---|---|---|
| 8,285,148 B2 | 10/2012 | Haunsten et al. |
| 2002/0044340 A1 | 4/2002 | Cavaliere et al. |
| 2003/0152388 A1 | 8/2003 | Uda et al. |
| 2006/0082869 A1 | 4/2006 | Uda et al. |
| 2007/0065147 A1 | 3/2007 | Qiao et al. |

FOREIGN PATENT DOCUMENTS

| | | |
|---|---|---|
| JP | 2008-245162 | 10/2008 |
| WO | 01/94899 A1 | 12/2001 |

OTHER PUBLICATIONS

EESR—The Extended European Search Report of European Patent Application No. 15164825.0 dated Oct. 5, 2015.

Markus Mayrock et al., "Monitoring of Linear and Nonlinear Signal Distortion in Coherent Optical OFDM Transmission", Journal of Lightwave Technology, vol. 27, No. 16, Aug. 15, 2009, pp. 3560-3566 (7 pages).

Pierluigi Poggiolini et al., "Analytical Modeling of Nonlinear Propagation in Uncompensated Optical Transmission Links", IEEE Photonics Technology Letters, vol. 23, No. 11, Jun, 1, 2011, pp. 742-744 (3 pages).

Pierluigi Poggiolini, "The GN Model of Non-Linear Propagation in Uncompensated Coherent Optical Systems", Journal of Lightwave Technology, vol. 30, No. 24, Dec. 15, 2012, pp. 3857-3879 (23 pages).

\* cited by examiner

MEASUREMENT APPARATUS AND METHOD OF MEASURING SIGNAL LIGHT QUALITY

CROSS-REFERENCE TO RELATED APPLICATION

This application is based upon and claims the benefit of priority of the prior Japanese Patent application No. 2014-102516, filed on May 16, 2014, the entire contents of which are incorporated herein by reference.

FIELD

The embodiment(s) discussed herein is related to a measurement apparatus and a measurement method of measuring signal light quality.

BACKGROUND

In an optical transmission technology, it is known that a technology for measuring (may be also referred to as "monitoring") an optical signal to noise ratio (OSNR) indicative of the ratio of a noise component to signal light. For example, documents D1 and D2 listed below disclose methods of calculating a noise component.
D1: U.S. Pat. No. 8,285,148
D2: Markus Mayrock and Herbert Haunstein, "Monitoring of Linear and Nonlinear Signal Distortion in Coherent Optical OFDM Transmission", JOURNAL OF LIGHTWAVE TECHNOLOGY, VOL. 27, NO. 16, Aug. 15, 2009, p. 3560-3566.

In the calculation methods disclosed in D1 and D2, an inverse SNR of a measurement channel is measured by using a coherent optical receiver. In addition, the transmission optical power of the measurement channel is increased by k times on an optical transmission side, and an inverse SNR of the measurement channel is measured. Further, an inverse SNR of another channel different from the measurement channel is measured. Then, based on the results of the measurements, noise components are calculated in order of a cross-phase modulation (XPM) component, a self-phase modulation (SPM) component, and an amplified spontaneous emission light (ASE noise) component. Here, the XPM component and the SPM component are examples of a non-linear noise component.

In the calculation methods described above, the coherent optical receiver of the optical reception side needs to obtain information of "k" corresponding to a power level ratio at the time when the transmission optical power (may be referred to as the "optical fiber launched power") is increased by k times on the optical transmission side. Accordingly, a configuration to obtain or calculate the non-linear noise component and the ASE noise component with respect to the signal light may be complicated. Thus, the cost of the configuration may be increased.

SUMMARY

According to an aspect, a measurement apparatus of measuring signal light quality is provided. The measurement apparatus may include a tunable wavelength filter, a measure and a controller. The tunable wavelength filter may be input signal lights having different power levels. The measure is available to measure an optical power level of light passing through the tunable wavelength filter. The controller is available to calculate a non-linear noise component and a spontaneous emission noise component of a signal light based on the measured optical power levels. The optical power levels are measured at different transmission frequencies for each of the signal lights having the different power levels in response to a control of the transmission frequency of the tunable wavelength filter.

Further, according to another aspect, a measurement method of measuring signal light quality is provided. The measurement method may include a control process, a measurement process and a calculation process. The control process may controls a transmission frequency of a tunable wavelength filter to which signal lights having different power levels are input. The measurement process may measure, in response to the control, power levels of light at different transmission frequencies for each of the signal lights having the different power levels. The calculation process may calculate a non-linear noise component and a spontaneous emission noise component of a signal light based on a result of the measure.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
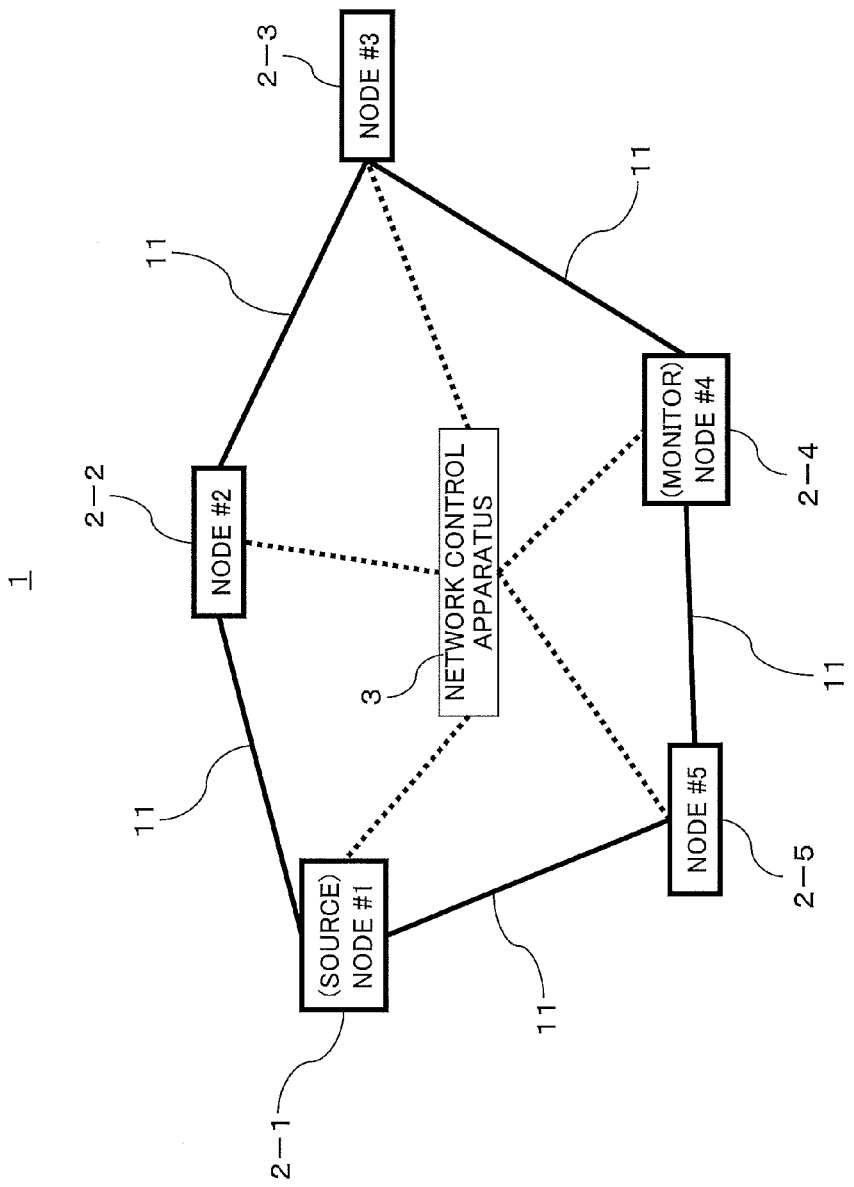
FIG. 1 is a block diagram that illustrates an exemplary configuration of an optical transmission system according to an embodiment.

Hereinafter, embodiment(s) of the present invention will be described with reference to the drawings. The embodiment(s) described below is merely examples and does not intend to exclude application of various modifications or technologies that are not explicitly described below unless otherwise mentioned. In addition, in the drawings referred in the embodiments described below, portions to which the same reference numeral is assigned denote same or similar portions unless otherwise mentioned.

FIG. 1 is a block diagram that illustrates an exemplary configuration of an optical transmission system according to an embodiment. The optical transmission system illustrated in FIG. 1 includes, for example, N (here, N is an integer of two or more) optical transmission apparatuses 2-1 to 2-N (#1 to #N), and a network control apparatus 3. In the example illustrated in FIG. 1, N=5. The "optical transmission apparatus" may also be referred to as the "node".

The node 2-$i$ (here, i represents any one of 1 to N) may be connected in a ring shape, as illustrated in FIG. 1, through an optical transmission line 11 to form an optical ring network that is an example of the optical transmission system 1. A signal light transmitted between the nodes 2-$i$ in the optical transmission system 1 may be a WDM signal light in which signal lights of a plurality of wavelengths are multiplexed or a signal light of single wavelength. The "wavelength" may also be referred to as the "channel".

The network control apparatus 3 is communicably connected to each node 2-$i$ and is available to perform communication relating to an operation, management, maintenance, and the like for each node 2-$i$. The communication may be referred to as OAM communication. The settings, the operations, and the like for the whole optical transmission system 1 are controllable by the OAM communication.

In the optical transmission system 1 with the above-described configuration, according to the present embodiment, any one of the nodes 2-$i$ monitors a signal light received through the optical transmission line 11 to individually acquire a nonlinear noise and a spontaneous emission light noise with respect to the signal light. The non-linear noise may also be referred to as the non-linear interference (NLI) noise, and the spontaneous emission light noise may also be referred to as the amplified spontaneous emission (ASE) noise. The node 2-$i$ which monitors a received signal light may be referred to as the monitor node 2-$i$ for descriptive purposes.

In the example illustrated in FIG. 1, the node 2-4 (#4) of i=4 corresponds to the "monitor node". Another node 2-$j$ (here, j is an integer of 1 to N, and j≠i) which transmits a signal light addressed to the monitor node 2-4 may be referred to as the source node 2-$j$. In the example illustrated in FIG. 1, the node 2-1 (#1) of j=1 corresponds to the "source node".

Figure 2:
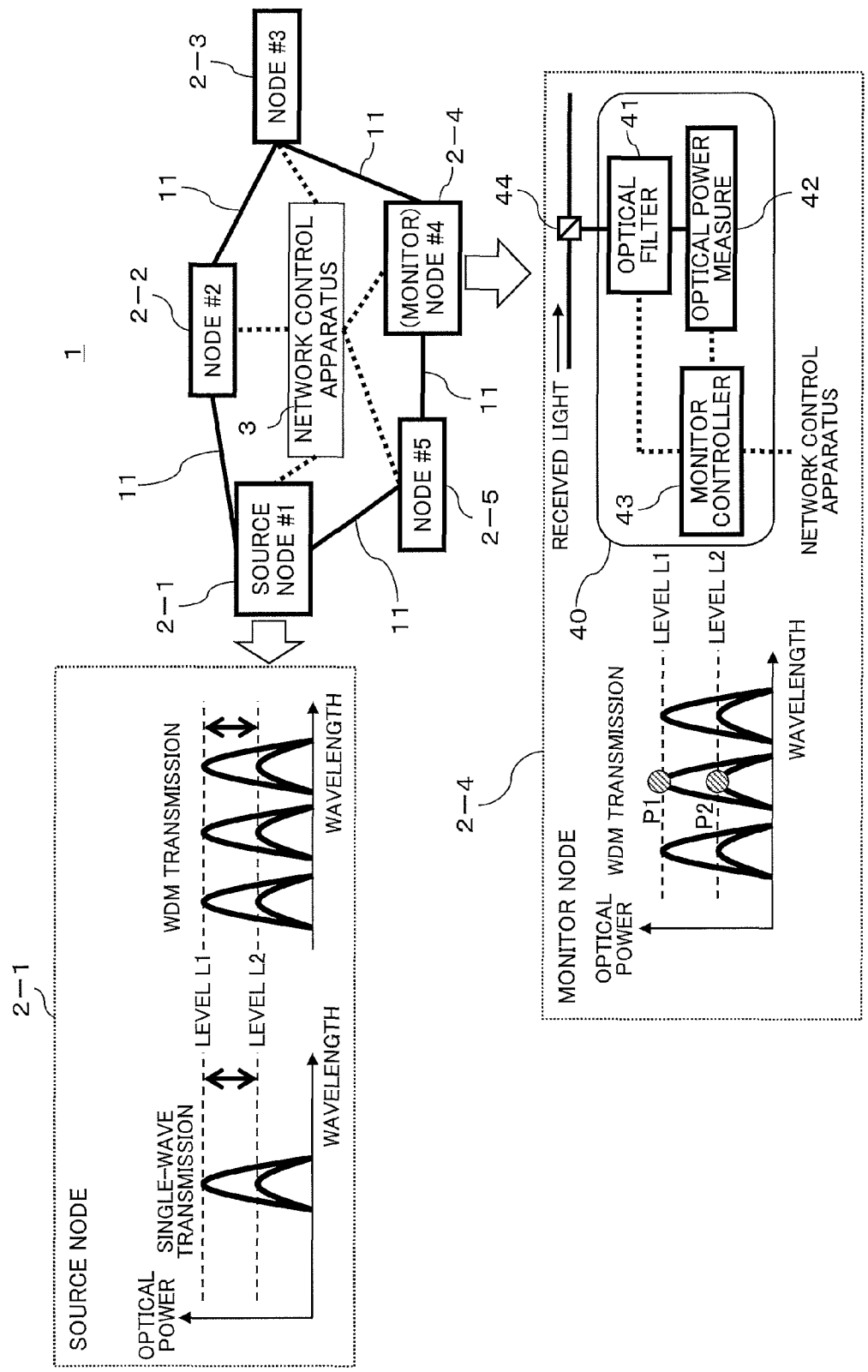
FIG. 2 is a diagram that illustrates a method of measuring signal light quality in the optical transmission system illustrated in FIG. 1.

For a monitor at the monitor node 2-4, the source node 2-1, as schematically illustrated in FIG. 2, changes transmission optical power of the signal light addressed to the monitor node 2-4, for example. FIG. 2 exemplarily illustrates the changes of a signal light of a single wavelength or a WDM signal light between different transmission optical power levels L1 and L2, as an example. For example, the change in the transmission optical power performed by the source node 2-1 may be controlled by the network control apparatus 3.

The monitor node 2-4 receives signal lights with different power levels according to the change in the transmission optical power, in response to the change performed by the source node 2-1. The monitor node 2-4 measures (or detects) the received lights of the different power levels and acquires an NLI noise component and an ASE noise component based on the result of the measurement.

As illustrated in FIG. 2, a monitor 40 that includes an optical filter 41, an optical power measure 42, and a monitor controller 43 is applicable to the monitor process performed in the monitor node 2-4. The monitor 40 is an example of a signal light quality measurement apparatus and may be referred to as a received-light monitor 40. As an example, a tunable wavelength filter having a variable transmission wavelength (or transmission frequency) is applicable to the optical filter 41. The tunable wavelength filter may be a tunable optical band-pass filter.

Upon changing the transmission frequency of the tunable wavelength filter 41 by the monitor controller 43, the optical power measure 42 is possible to measure (or detect) reception optical power levels of the different frequencies. In FIG. 2, reference numeral 44 denotes an optical divider 44. The optical divider 44 is available to split (may also be referred to as "tap") a light received through the optical transmission line 11 and to output one of split lights to the optical filter 41 as a monitor light.

Here, the power level P of the signal light received by the monitor node 2-4 (in other words, measured by the optical power measure 42 of the received-light monitor 40) can be represented in Mathematical Formula 1 set out below.

$$P = P_{sig} + P_{ASE} + P_{NLI} \qquad \text{[Mathematical Formula 1]}$$

In Mathematical Formula 1, $P_{sig}$ denotes a power level of a signal light component, $P_{ASE}$ denotes a power level of an ASE noise component, and $P_{NLI}$ denotes a power level of an NLI noise component. In other words, the power level P of the signal light can be represented by a sum of the power level $P_{sig}$ of the signal light component, the power level $P_{ASE}$ of the ASE noise component, and the power level $P_{NLI}$ of the NLI noise component.

The power level $P_{NLI}$ of the NLI noise component can be represented by Mathematical Formula 2 set out below and is proportional to the cube of the power level $P_{sig}$ of the signal light component. In Mathematical Formula 2, $\zeta$ represents a coefficient (it may be referred to as a "proportionality coefficient" or a "calibration coefficient").

$$P_{NLI} = \zeta P_{sig}^{3} \qquad \text{[Mathematical Formula 2]}$$

Meanwhile, the power level $P_{ASE}$ of the ASE noise component can be represented by Mathematical Formula 3 set out below.

$$P_{ASE} = P - P_{sig} - P_{NLI} \qquad \text{[Mathematical Formula 3]}$$

Based on the above-described Mathematical Formulas 1 to 3, it is understood that when the proportionality coefficient ζ is available, the power level $P_{ASE}$ of the ASE noise component and the power level $P_{NLI}$ of the non-linear noise component can be calculated from the power level P of the received signal light.

The proportionality coefficient ζ can be acquired, for example, by measuring the reception optical power levels of signal lights transmitted from the source node 2-1 with different transmission optical power levels at different frequencies in the monitor node 2-4, as described above.

Figure 3:
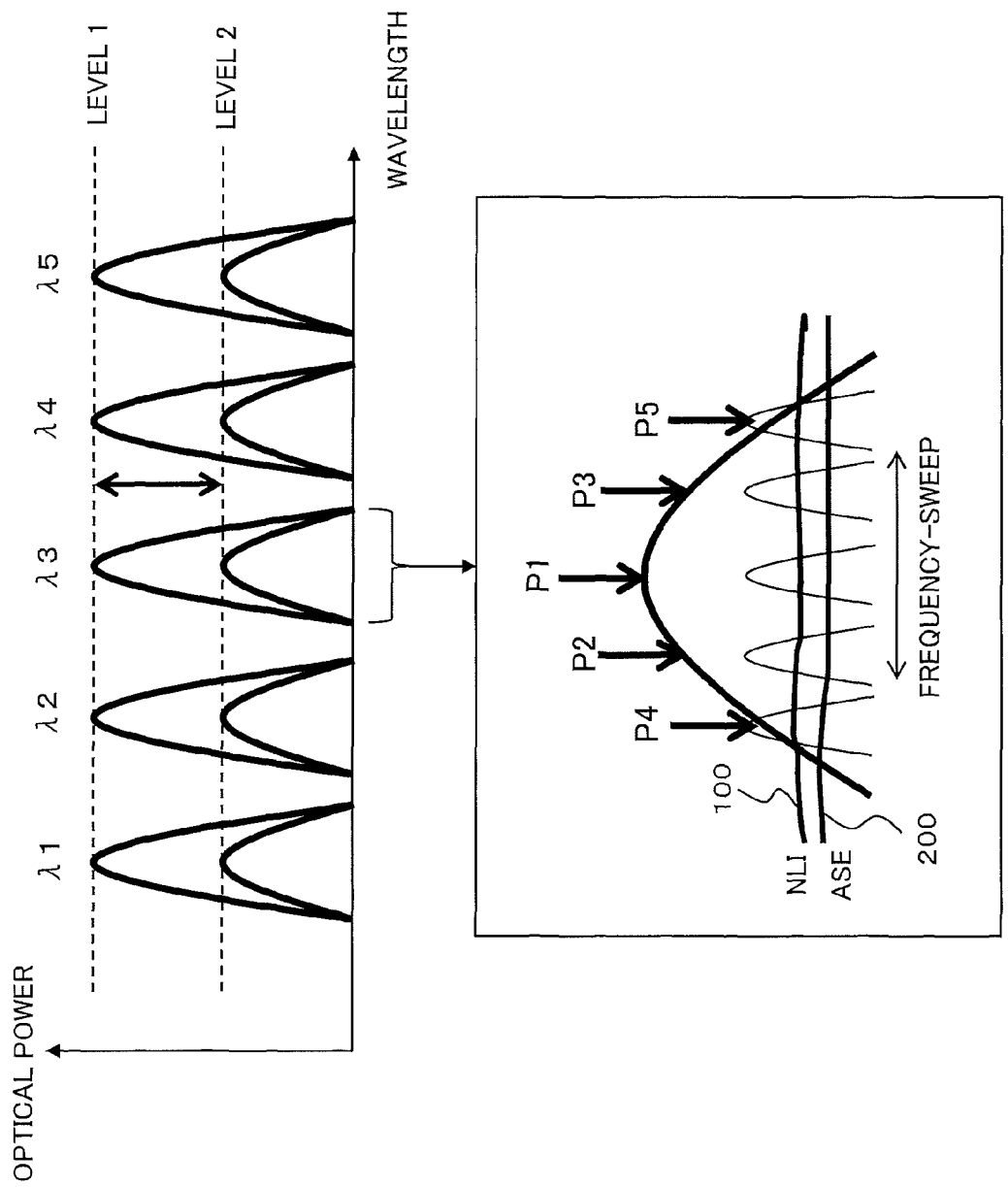
FIG. 3 is a diagram that illustrates measurement target wavelengths and measurement target frequencies in the method of measuring signal light quality in the optical transmission system illustrated in FIG. 1.

For example, as schematically illustrated in FIG. 3, it is assumed that a WDM signal light including wavelengths λ1 to λ5 is transmitted by the source node 2-1 in the different transmission optical power levels L1 and L2. The monitor node 2-4 measures the optical power levels at a plurality of different frequencies in a spectrum of light with a measurement target wavelength (for example, λ3). FIG. 3 exemplarily illustrates that any two or more of optical power levels $P_{f1}$ to $P_{f5}$ corresponding to different frequencies f1 to f5 may be measured.

For example, in the case illustrated in FIG. 3, the monitor node 2-4 may measure the optical power levels $P_{f1}$ and $P_{f2}$ corresponding to the different frequencies f1 and f2 included in an optical spectrum of a measurement target wavelength (hereinafter, may also be referred to as the "measurement wavelength"). The first frequency f1 may be a frequency at which the power is maximum in the spectrum of the signal light. The first frequency f1 with the maximum power may be the center frequency of the signal light.

The optical power levels at the different frequencies can be measured by the optical power measure 42 by, for example, changing the transmission frequency of the tunable wavelength filter 41 by the monitor controller 43. The "change" of the transmission frequency may also be referred to as the "sweep" of the transmission frequency.

in the optical spectrum focusing on the measurement wavelength illustrated in FIG. 3, a solid line 100 represents the NLI noise component, and a solid line 200 represents the ASE noise component. As illustrated in FIG. 3, it is assumed that the NLI noise component and the ASE noise component may be considered as being constant or being substantially constant (in other words, variations may be ignored) in the spectrum of the signal light of the measurement target wavelength.

In this case, the optical power levels at the different frequencies f1 and f2 included in the optical spectrum of the measurement wavelength at a time when the transmission optical power level is the first level L1 may be denoted as $P_{f1(L1)}$, $P_{f2(L1)}$ respectively. Further, the optical power levels at the different frequencies f1 and f2 included in the optical spectrum of the measurement wavelength at a time when the transmission optical power level is the second level L2 may be denoted as $P_{f1(L2)}$ and $P_{f2(L2)}$, respectively.

In such a case, the optical power levels $P_{f1(L1)}$ and $P_{f2(L1)}$ may be respectively represented by the following Mathematical Formulas 4 and 5, and the optical power levels $P_{f1(L2)}$ and $P_{f2(L2)}$ may be respectively represented by the following Mathematical Formulas 6 and 7.

$$P_{f1(L1)} = P_{sig(L1)} + P_{ASE} + \zeta P_{sig(L1)}^3 \quad \text{[Mathematical Formula 4]}$$

$$P_{f2(L1)} = dP_{sig(L1)} + P_{ASE} + \zeta P_{sig(L1)}^3 \quad \text{[Mathematical Formula 5]}$$

$$P_{f1(L2)} = P_{sig(L2)} + P_{ASE} + \zeta P_{sig(L2)}^3 \quad \text{[Mathematical Formula 6]}$$

$$P_{f2(L2)} = d_{sig(L2)} + P_{ASE} + \zeta P_{sig(L2)}^3 \quad \text{[Mathematical Formula 7]}$$

Here, in the right-hand members of Mathematical Formulas 4 and 5 described above, "$P_{sig\ (L1)}$" of the first term represents the power level of the signal light component transmitted by the source node 2-1 with the first level L1, and the third term represents the power level of the NLI noise component in the first level L1. Meanwhile, in the right-hand members of Mathematical Formulas 6 and 7, "$P_{sig\ (L2)}$" of the first term represents the power level of the signal light component transmitted by the source node 2-1 with the second level L2, and the third term represents the power level of the NLI noise component in the second level L2. Furthermore, in the right-hand members of Mathematical Formulas 5 and 7, "d" represents the calibration coefficient used to calibrate a difference between the transmission optical power levels at different frequencies. A method of acquiring the calibration coefficient "d" will be described later.

Based on the above-described Mathematical Formulas 4 to 7, the power levels $P_{sig\ (L1)}$ and $P_{sig\ (L2)}$ of the signal light component at the time when the transmission optical power levels at the source node 2-1 are the levels L1 and L2 can be represented by the following Mathematical Formulas 8 and 9, respectively.

$$P_{sig(L1)} = \frac{P_{f1(L1)} - P_{f2(L1)}}{1 - d} \quad \text{[Mathematical Formula 8]}$$

$$P_{sig(L2)} = \frac{P_{f1(L2)} - P_{f2(L2)}}{1 - d} \quad \text{[Mathematical Formula 9]}$$

The following Mathematical Formulas 10 and 11 are derived from the above-described Mathematical Formulas 8 and 9.

$$P_{f1(L1)} - P_{f1(L2)} = P_{sig(L1)} - P_{sig(L2)} + \zeta(P_{sig(L1)}^3 - P_{sig(L2)}^3) \quad \text{[Mathematical Formula 10]}$$

$$\frac{P_{f2(L1)} - dP_{f1(L1)}}{1-d} - \frac{P_{f2(L2)} - dP_{f1(L2)}}{1-d} = \zeta\left\{\left(\frac{P_{f1(L1)} - P_{f2(L1)}}{1-d}\right)^3 - \left(\frac{P_{f1(L2)} - P_{f2(L2)}}{1-d}\right)^3\right\} \quad \text{[Mathematical Formula 11]}$$

By using the following Mathematical Formula 12 obtained by modifying Mathematical Formula 11, the proportionality coefficient ζ can be acquired.

$$\zeta = (1-d)^2 \frac{(P_{f2(L1)} - dP_{f1(L1)}) - (P_{f2(L2)} - dP_{f1(L2)})}{(P_{f1(L1)} - P_{f2(L1)})^3 - (P_{f1(L2)} - P_{f2(L2)})^3} \quad \text{[Mathematical Formula 12]}$$

The calculation of the proportionality coefficient ζ using Mathematical Formula 12 may be performed by the monitor controller 43 illustrated in FIG. 2, for example.

Next, the method of acquiring the calibration coefficient d in Mathematical Formula 12 will be described.

The calibration coefficient d may be acquired in the source node 2-1, for example. In the source node 2-1, it may be considered that a noise is not included in the transmitted light or a noise has ignorable magnitude even when the noise is included in the transmitted light. Accordingly, by measuring at the source node 2-1 the transmission optical power levels P' at the frequencies corresponding to the measurement frequencies (for example, f1 and f2) in the monitor node 2-4, the calibration coefficient d can be acquired.

For example, the transmission optical power level P'$_{f1}$ at the frequency f1 can be represented by the following Mathematical Formula 13, and the transmission optical power level P'$_{f2}$ at the frequency f2 can be represented by the following Mathematical Formula 14

$$P'_{f1} = P_{sig} \quad \text{[Mathematical Formula 13]}$$

$$P'_{f2} = dP_{sig} \quad \text{[Mathematical Formula 14]}$$

Accordingly, the calibration coefficient d can be acquired by the following Mathematical Formula 15 based on the transmission optical power levels P'$_{f1}$ and P'$_{f2}$ measured in the source node 2-1.

$$d = \frac{P'_{f2}}{P'_{f1}} \quad \text{[Mathematical Formula 15]}$$

Figure 4:
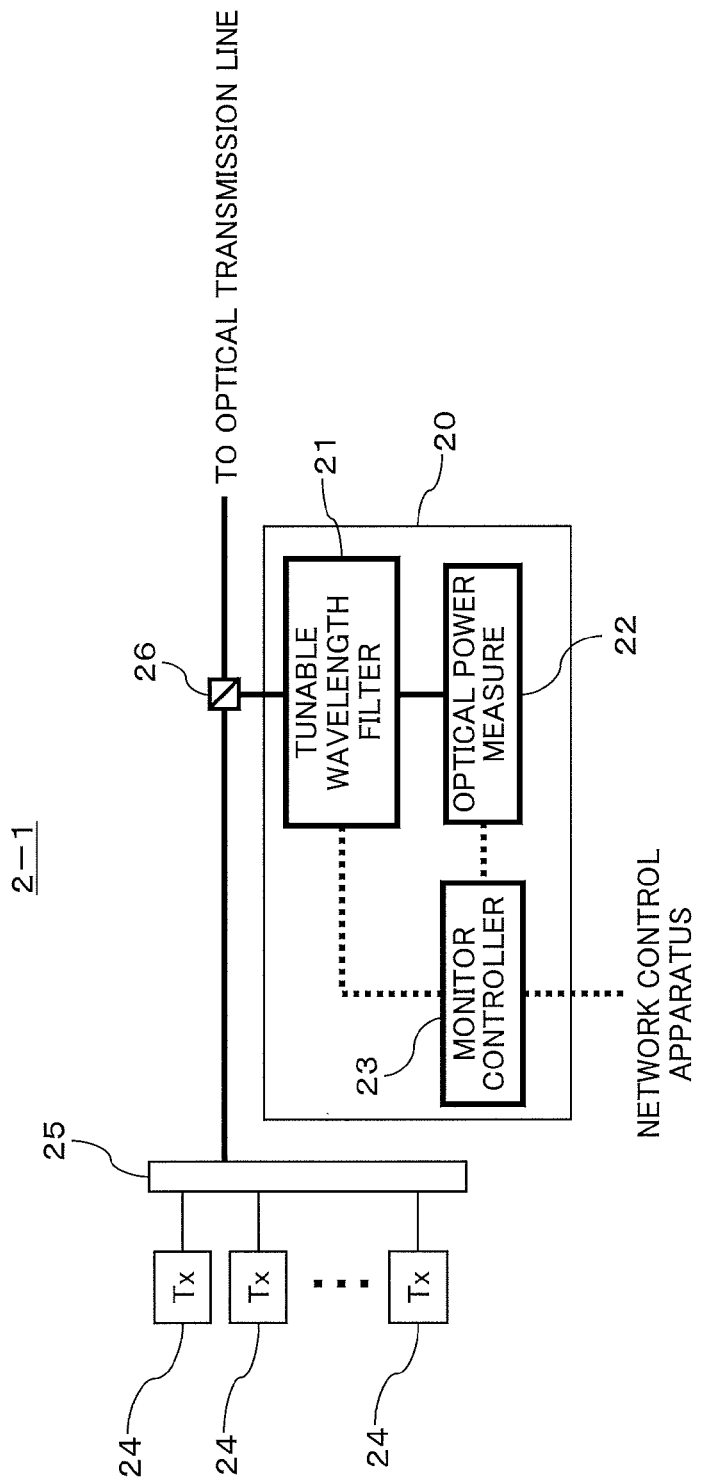
FIG. 4 is a block diagram that illustrates an exemplary configuration of a source node illustrated in FIG. 1.

Transmission optical power levels P'$_{f1}$ and P'$_{f2}$ can be measured by a monitor with a configuration same as or similar to that of the reception optical monitor 40 in the monitor node 2-4. For example, as illustrated in FIG. 4, in the source node 2-1 that transmits a WDM light, a monitor 20 may be arranged in an optical path in which a transmission light transmitted from a wavelength demultiplexer (e.g., WDM coupler) 25 to the optical transmission line 11 propagates. The monitor 20 monitors the power level of the transmission light to the optical transmission line 11. The monitor 20 may also be referred to as the transmission optical monitor 20. The WDM coupler 25 multiplexes output lights from a plurality of optical transmitter 24 corresponding to wavelengths to be multiplexed in the WDM light and outputs the WDM light to the optical transmission line 11.

The transmission optical monitor 20, similar to the reception optical monitor 40 in the monitor node 2-4, may include a tunable wavelength filter 21 that is an example of the optical filter 21, an optical power measure 22, and a monitor controller 23.

By changing the transmission frequency of the tunable wavelength filter 21 by the monitor controller 23, the transmission optical power levels of different frequencies can be measured (or detected) in the optical power measure 22. In FIG. 4, a reference numeral 26 denotes an optical splitter 26 that is available to tap light transmitted to the optical transmission line 11 and to output the tapped-light to the optical filter 21 as monitor light.

The calculation of the calibration coefficient d using Mathematical Formula 15 may be performed in the monitor controller 23, for example. The calculated calibration coefficient d may be notified to the network control apparatus 3 illustrated in FIG. 1. The network control apparatus 3 may notify the received calibration coefficient d to the reception optical monitor 40 (e.g., monitor controller 43) in the monitor node 2-4.

The reception optical monitor 40 performs measurement by using the optical power measure 42 while sweeping the transmission frequency of the tunable wavelength filter 41 by the monitor controller 43, thereby measuring the reception optical power levels P$_{f1}$ and P$_{f2}$ at the different frequencies f1 and f2.

Then, the monitor controller 43 individually acquires the power levels of the NLI noise component and the ASE noise component based on the measured reception optical power levels P$_{f1}$ and P$_{f2}$ and the calibration coefficient d received from the network control apparatus 3. For example, the monitor controller 43 acquires the power levels of noise components of the NLI and the ASE through a calculation process represented in the following Mathematical Formulas 21 and 22 based on the relations represented by the following Mathematical Formulas 16 to 20.

$$P_{f1} = P_{sig} + P_{ASE} + P_{NLI} \quad \text{[Mathematical Formula 16]}$$

$$P_{f2} = dP_{sig} + P_{ASE} + P_{NLI} \quad \text{[Mathematical Formula 17]}$$

$$P_{sig} = \frac{P_{f1} - P_{f2}}{1 - d} \quad \text{[Mathematical Formula 18]}$$

$$P_{NLI} = \zeta P_{sig}^3 \quad \text{[Mathematical Formula 19]}$$

$$P_{ASE} = P_{f1} - P_{sig} - P_{NLI} \quad \text{[Mathematical Formula 20]}$$

$$P_{NLI} = \zeta \left(\frac{P_{f1} - P_{f2}}{1 - d}\right)^3 \quad \text{[Mathematical Formula 21]}$$

$$P_{ASE} = P_{f1} - \frac{P_{f1} - P_{f2}}{1 - d} - \zeta \left(\frac{P_{f1} - P_{f2}}{1 - d}\right)^3 \quad \text{[Mathematical Formula 22]}$$

Figure 5:
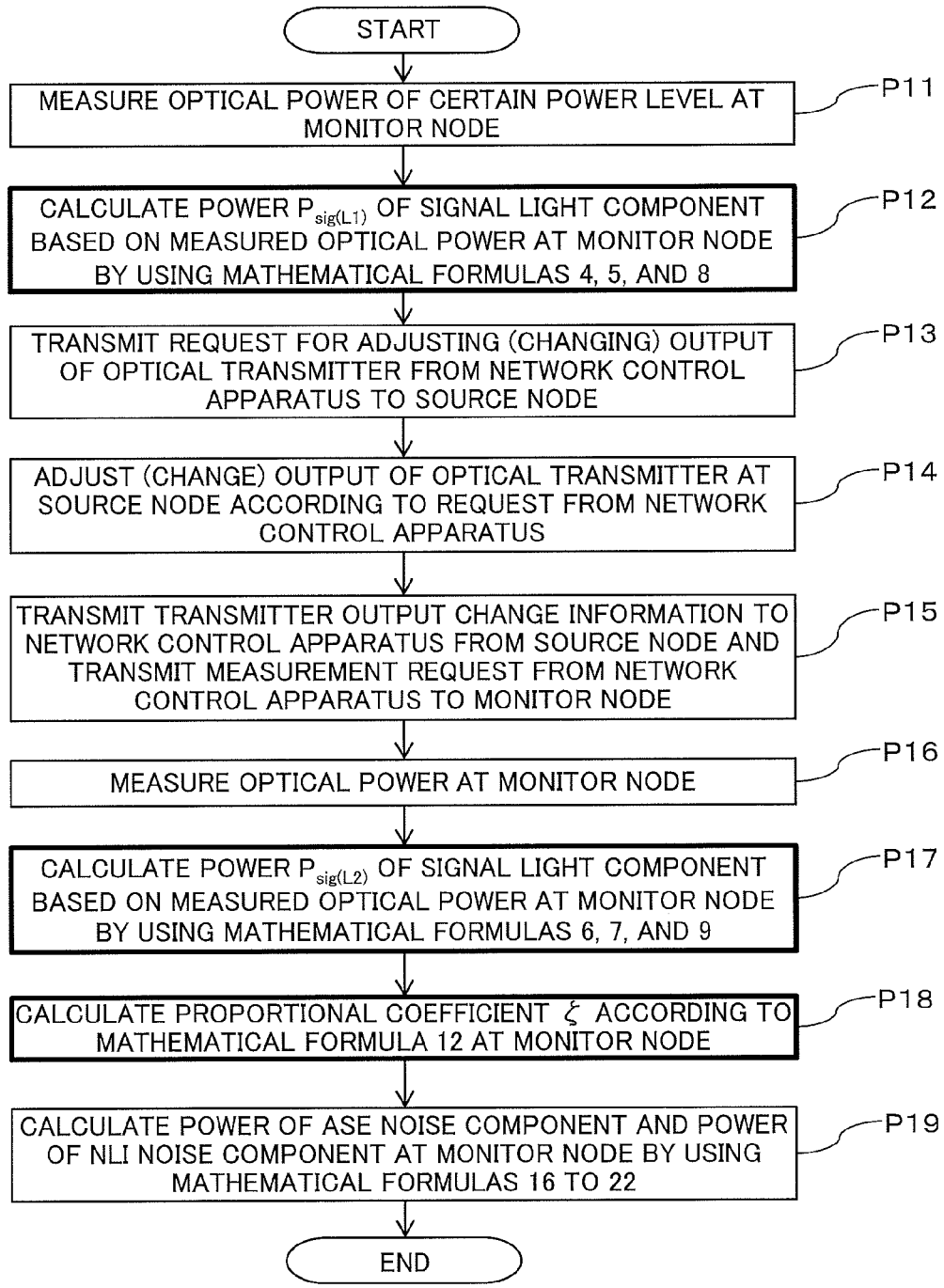
FIG. 5 is a flowchart that illustrates the method of measuring signal light quality in the optical transmission system illustrated in FIG. 1.

An example of the operations of changing the transmission optical power level at the source node 2-1, measuring the reception optical power level at the monitor node 2-4, and calculating power levels of the NLI noise component and the ASE noise component described above are illustrated in FIG. 5. As illustrated in FIG. 5, the monitor node 2-4 measures the optical power levels of different frequencies (for example, f1 and f2) at a certain transmission optical power level (For example, L1) by using the optical power measure 42 of the reception optical monitor 40 (process P11).

Upon measuring the optical power levels by the optical power measure 42, the monitor controller 43 acquires a power level P$_{sig\ (L1)}$ of a signal light component from the measured optical power levels by using Mathematical Formulas 4, 5, and 8 described above (process P12).

Meanwhile, the network control apparatus 3 requests the source node 2-1 to change the transmission optical power level (process P13). In response to the reception of the request, the source node 2-1 changes the transmission optical power level from the level L1 to the level L2 (process P14).

Upon changing the transmission optical power levels, the source node 2-1 transmits information indicating that a transmission optical power level has been changed to the network control apparatus 3. The information may be referred to as the "transmission optical power change information". In response to a reception of the transmission optical power change information, the network control apparatus 3 requests the monitor node 2-4 to perform monitoring (process P15).

In response to a reception of the monitor request, the monitor node 2-4 measures, by using the optical power measure 42, the optical power levels at the frequencies (f1 and f2) that are the same as the measurement frequencies in process P11 in the transmission optical power level changed in the source node 2-1 (process P16).

In response to the measurement of the optical power levels by the optical power measure 42, the monitor controller 43 acquires a power level P$_{sig\ (L2)}$ of a signal light component based on the measured optical power levels by using Mathematical Formulas 6, 7, and 9 described above (process P17).

Upon acquiring the reception power levels $P_{sig\ (L1)}$ and $P_{sig\ (L2)}$ of the signal light component at different transmission optical power levels, the monitor controller 43 calculates Mathematical Formula 12 described above to acquire the proportionality coefficient ζ (process P18).

Upon acquiring the proportionality coefficient ζ, the monitor controller 43 calculates the power levels of the NLI noise component and the ASE noise component according to Mathematical Formulas 16 to 22 described above (process P19).

As described above, it is possible to acquire each of the noise components individually and quantitatively, by changing the transmission optical power level at the source node 2-1 to a different power level and by measuring the reception power levels of the different frequencies at different power levels at the monitor node 2-4. Therefore, unlike a conventional case, the monitor node 2-4 is possible to acquire each of the noise components without receiving from the source node 2-1 the power level ratio information at the time when the transmission optical power at the optical transmission side is changed.

Since the NLI noise component and the ASE noise component can be acquired individually (or separately), it is possible to easily specify (or identify) whether deterioration of the OSNR is caused by an increase in the NLI noise component according to a variation of the optical power or caused by attenuation of the signal light power. In other words, it is possible to solve a difficulty in identifying the cause of the deterioration of the OSNR even though the deterioration of the OSNR can be detected by monitoring the OSNR.

The OSNR can be acquired by using the following Mathematical Formula 23.

$$OSNR = \frac{P_{sig}}{P_{ASE} + P_{NLI}} \quad \text{[Mathematical Formula 23]}$$

In addition, it is possible to achieve an optical monitor available to flexibly change the measurement frequency with a simple and easy configuration at low cost, by using the tunable wavelength filter 41 (or 21) that is an example of an optical filter in the monitor 40 (or 20) of the reception optical power (or the transmission optical power).

The measurement of the optical power level using a tunable wavelength filter may be used for monitoring an optical channel (OCM) or an OSNR originally. Therefore, the monitor 40 (or 20) may be achieved by using an OCM or OSNR monitor pre-installed in the monitor node 2-4 or the source node 2-1. Accordingly, it is possible to suppress the circuit scale and the cost to achieve the individual measurement of the NLI noise and the ASE noise described above.

Next, exemplary configurations of the source node 2-1 and the monitor node 2-4 to achieve the aforementioned individual measurement of the NLI noise and the ASE noise described will be described with reference to FIGS. 6 to 8.

(Source Node)

Figure 6:
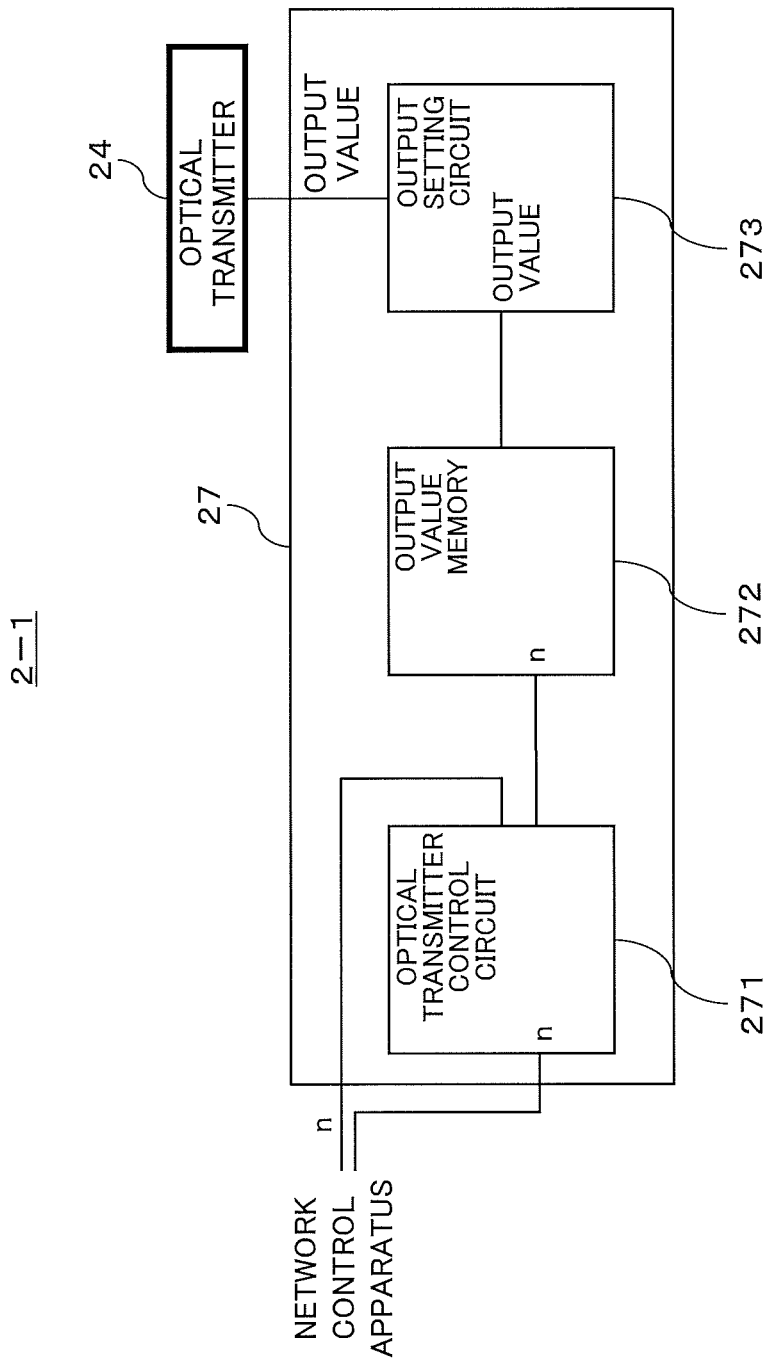
FIG. 6 is a block diagram that illustrates an exemplary configuration of a controller in the source node illustrated in FIG. 4.

FIG. 6 is a block diagram that illustrates an exemplary configuration focusing on a controller 27 of the source node 2-1, which controls the optical transmitter 24 (see FIG. 4). The controller 27 (hereinafter, it may be referred to as an "optical transmitter controller 27") illustrated in FIG. 6 is available to control the output optical power level of the optical transmitter 24, for example, in response to the control of the network control apparatus 3 (see FIG. 1).

Thus, the optical transmitter controller 27 may include an optical transmitter control circuit 271, an output value memory 272, and an output setting circuit 273, for example. In FIG. 6, "n" represents a control signal, and the control signal may be used to control the timing and the like of the operation (or control) of the optical transmitter controller 27. In addition, "n" illustrated in FIGS. 7 and 8 may also be considered as a control signal used to control the timing and the like of the operation (control).

The optical transmitter control circuit 271 is operable to receive information (for example, information used for setting an output value of the optical transmitter 24) which controls the output optical power of the optical transmitter 24 and has been transmitted from the network control apparatus 3, and to store the received information in the output value memory 272.

The output value memory 272 may be a storage medium such as a RAM for which information can be written and read appropriately.

The output setting circuit 273 is operable to read out an output value stored in the output value memory 272 and to set the output value to the optical transmitter 24. In this way, the output optical power of the optical transmitter 24 is controlled to the set output value.

Accordingly, it is possible to set the transmission optical power levels at the source node 2-1 to the different power levels L1 and L2, by giving different output values from the network control apparatus 3 to the optical transmitter controller 27 (e.g., optical transmitter control circuit 271) in the source node 2-1, as described above.

The optical transmitter control circuit 271 may notify (may be referred to as "feedback") the network control apparatus 3 of the output value set to the optical transmitter 24 from the output value memory 272 as information indicative of the current transmission optical power of the optical transmitter 24.

The optical transmitter control circuit 271, the output value memory 272, and the output setting circuit 273 may be integrally (or partly integrally) configured as a digital electric circuit such as an LSI or a field-programmable gate array (FPGA). In addition, a part or all of the functions of the optical transmitter controller 27 described above may be shared by a function of the monitor controller 23.

Figure 7:
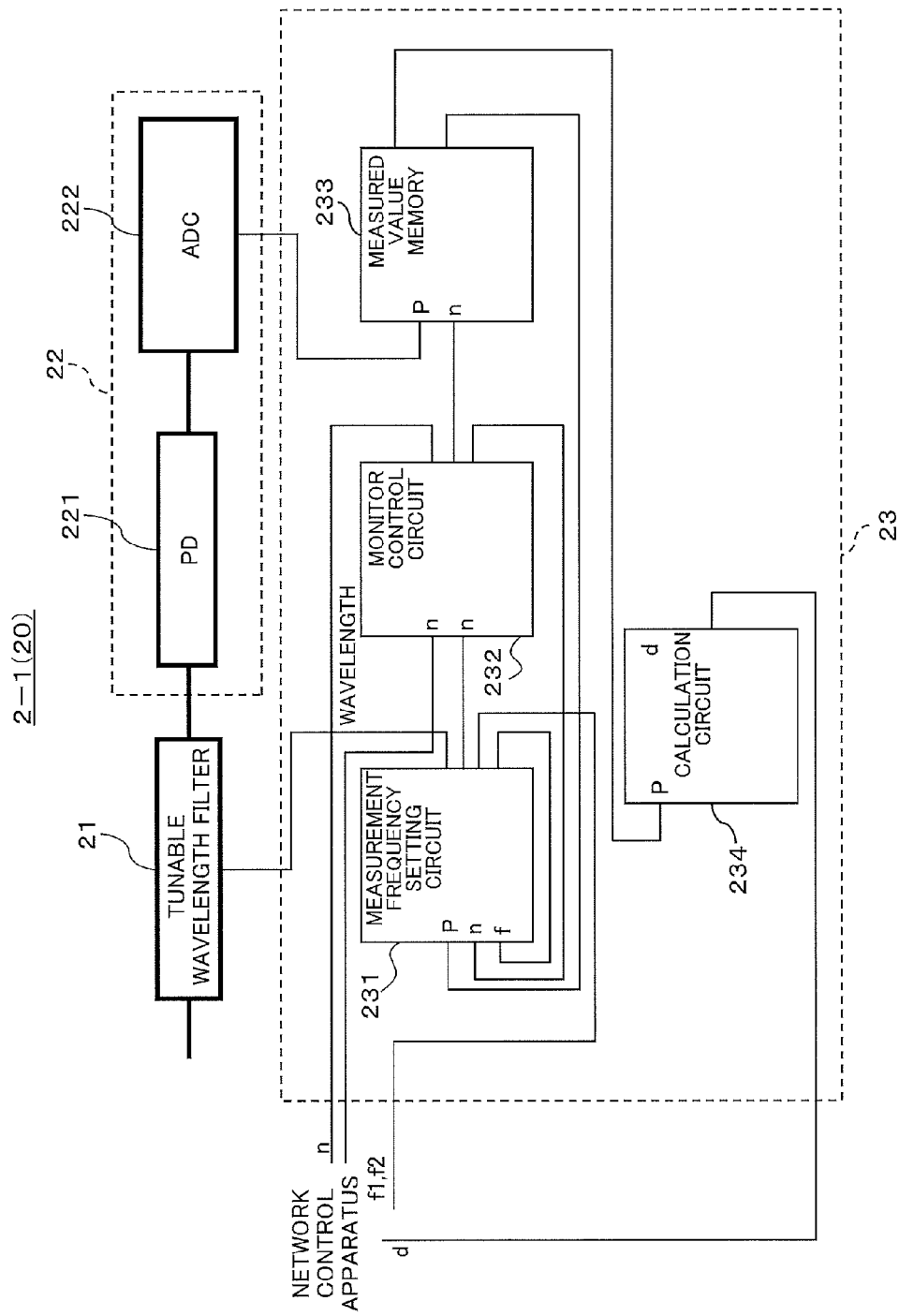
FIG. 7 is a block diagram that illustrates an exemplary configuration of an optical power measure and a monitor controller in the source node illustrated in FIG. 4.

Next, FIG. 7 is a block diagram that illustrates an exemplary configuration focusing on the transmission optical monitor 20 (see FIG. 4) in the source node 2-1. The transmission optical monitor 20 illustrated in FIG. 7 may include, in addition to the tunable wavelength filter 21 and the monitor controller 23 described above, a photo detector (PD) 221 and an analog-to-digital converter (ADC) 222 that form an example of the optical power measure 22. As described above, the tunable wavelength filter 21 and the PD 221 may be shared by the pre-installed OCM or OSNR monitor.

The PD 221 generates (or outputs) an analog electrical signal having amplitude according to the reception power level of light passing through the tunable wavelength filter 21. The analog electrical signal may be a signal generated by converting a current value according to the reception optical power level into a voltage value by using a trans-impedance amplifier (TIA), for example.

The ADC 222 converts the analog electrical signal having the amplitude according to the reception optical power, which is input from the PD 221, into a digital electrical signal. The digital electrical signal may be stored in, for example, the measured value memory 233 of the monitor controller 23 as a result of the measurement of the reception optical power of light passing through the tunable wavelength filter 21.

The monitor controller 23 is operable to control the transmission frequency of the tunable wavelength filter 21 in response to the control of the network control apparatus 3 to control the frequency of the light passing through the tunable wavelength filter 21 to the PD 221.

For example, the monitor controller 23 may include a measurement frequency setting circuit 231, a monitor control circuit 232, a measured value memory 233, and a calibration coefficient (d) calculation circuit 234.

The measurement frequency setting circuit 231 is operable to determine measurement frequency (for example, f1 or f2 described above) in response to, for example, the reception of a control signal from the network control apparatus 3 and to set (or control) the transmission frequency of the tunable wavelength filter 21 to the determined measurement frequency. The determination of the measurement frequency may be autonomously performed by the measurement frequency setting circuit 231 based on a measured value of each frequency measured while performing a sweep control of the transmission frequencies of the tunable wavelength filter 21, as described later. However, the setting of measurement frequencies may also be performed based on setting information given from the network control apparatus 3.

The monitor control circuit 232 is operable to control, in response to the control of the network control apparatus 3, the operation timing and the like of the measurement frequency setting circuit 231 and the measured value memory 233, for example.

The measured value memory 233 may store measured values of the reception optical power obtained by the ADC 222 as described above. The measured value memory 233 may be a storage medium such as a RAM for which information can be written and read appropriately.

The d calculation circuit 234 is operable to read out a measured value of the reception optical power stored in the measured value memory 233 and to calculate the calibration coefficient d according to Mathematical Formula 15 described above. The calculated calibration coefficient d may be notified from the calibration coefficient calculation circuit 234 to the network control apparatus 3.

The measurement frequency setting circuit 231, the monitor control circuit 232, the measured value memory 233, and the calibration coefficient calculation circuit 234 may be integrally (or partly integrally) configured as a digital electric circuit such as the LSI or the FPGA.

(Monitor Node)

Figure 8:
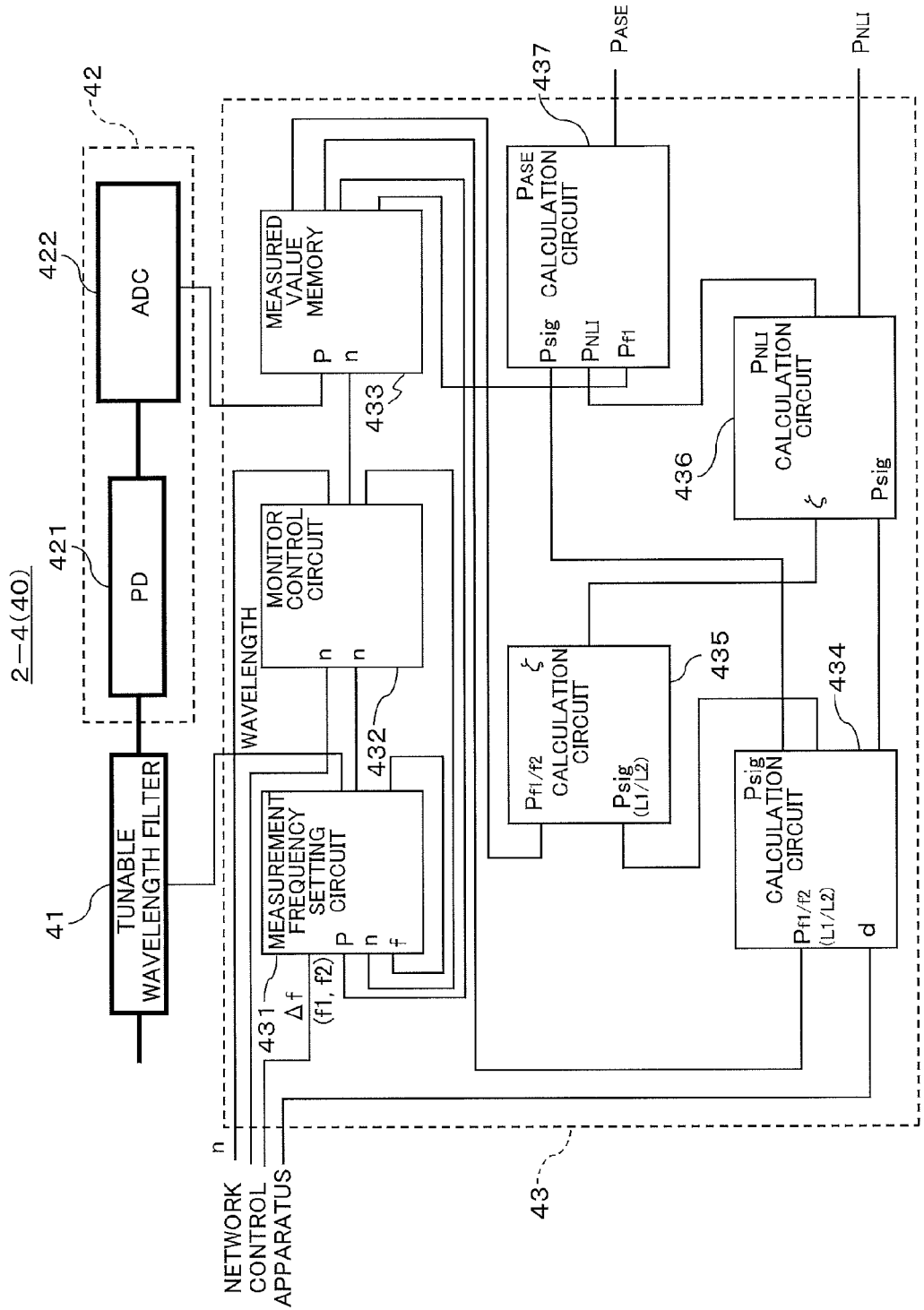
FIG. 8 is a block diagram that illustrates an exemplary configuration of an optical power measure and a monitor controller in a monitor node illustrated in FIG. 2.

Next, FIG. 8 is a block diagram that illustrates an exemplary configuration focusing on the reception optical monitor 40 (see FIG. 2) in the monitor node 2-4. The reception optical monitor 40 illustrated in FIG. 8 may include, in addition to the tunable wavelength filter 41 and the monitor controller 43 described above, a PD 421 and an ADC 422 that form an example of the optical power measure 42. The tunable wavelength filter 41 and the PD 421 may also be shared by the OCM or OSNR monitor, as described above.

The PD 421 generates an analog electrical signal having amplitude according to the reception optical power of light passing through the tunable wavelength filter 41. The analog electrical signal may be a signal generated by converting a current value according to the reception optical power into a voltage value by using a trans-impedance amplifier (TIA), for example.

The ADC 422 converts an analog electrical signal having the amplitude according to the reception optical power, which is input from the PD 421, into a digital electrical signal. The digital electrical signal may be stored in, for example, the measured value memory 433 of the monitor controller 43 as a result of the measurement of the reception optical power of light passing through the tunable wavelength filter 41.

The monitor controller 43 is operable to control, for example, the transmission frequencies of the tunable wavelength filter 41 in response to the control of the network control apparatus 3 to thereby control the frequency of light passing through the tunable wavelength filter 41 to the PD 421.

For example, the monitor controller 43 may include, similar to the transmission optical monitor 20, a measurement frequency setting circuit 431, a monitor control circuit 432, and a measured value memory 433. Further, the reception optical monitor 40 may include a signal light component power ($P_{sig}$) calculation circuit 434, a proportionality coefficient ($\zeta$) calculation circuit 435, an NLI noise component power ($P_{NLI}$) calculation circuit 436, and an ASE noise component power ($P_{ASE}$) calculation circuit 437.

The measurement frequency setting circuit 431 is operable to receive, for example, setting information of measurement frequency (for example, f1 or f2 described above), which has been transmitted from the network control apparatus 3 and to set (or control) the transmission frequency of the tunable wavelength filter 41 to the frequency corresponding to the setting information. The measurement frequency setting circuit 431 may also perform, similar to the measurement frequency setting circuit 231 of the transmission optical monitor 20, a sweep control of the tunable wavelength filter 41 to determine (or calibrate) the measurement frequencies based on a measured value measured for each frequency.

The monitor control circuit 432 is operable to control, for example, the operation timing and the like of the measurement frequency setting circuit 431 and the measured value memory 433 in response to the control of the network control apparatus 3.

The measured value memory 433 may store a measurement result of the reception optical power levels obtained by the ADC 422 as described above. The measured value memory 433 may be a storage medium such as a RAM for which information can be read and written appropriately.

The $P_{sig}$ calculation circuit 434 is operable to calculate a signal light component power level $P_{sig}$ of received light according to the aforementioned Mathematical Formula 18, based on the calibration coefficient d notified from, for example, the network control apparatus 3 and the measurement result of the reception optical power levels stored in the measured value memory 433. The calculated signal light component power level $P_{sig}$ may be given to both of the $\zeta$ calculation circuit 435 and the $P_{ASE}$ calculation circuit 437.

The $\zeta$ calculation circuit 435 is operable to calculate the proportionality coefficient $\zeta$ according to Mathematical Formula 12 described above, based on the calculation result obtained by the $P_{sig}$ calculation circuit 434 and the measurement result of optical power levels stored in the measured value memory 433. The calculated proportionality coefficient $\zeta$ may be given to the $P_{NLI}$ calculation circuit 436.

The $P_{NLI}$ calculation circuit 436 is operable to calculate an NLI noise component power level $P_{NLI}$ according to the aforementioned Mathematical Formula 21 described above, based on the calculation result of the $P_{sig}$ calculation circuit 434 and the calculation result of the ζ calculation circuit 435. The calculated NLI noise component power level $P_{NLI}$ may be given to the $P_{ASE}$ calculation circuit 437.

The $P_{ASE}$ calculation circuit 437 is operable to calculate an ASE noise component power level $P_{ASE}$ according to the aforementioned Mathematical Formula 22, based on the calculation result of the $P_{sig}$ calculation circuit 434, the calculation result of the $P_{NLI}$ calculation circuit 436 and the measurement result of reception optical power levels stored in the measured value memory 433.

One or both of the calculation results obtained by the $P_{NLI}$ calculation circuit 436 and the $P_{ASE}$ calculation circuit 437 may be output to an external apparatus such as a maintenance terminal. The external apparatus may be the network control apparatus 3.

Operation Example

Next, an example of the operations of the source node 2-1 (focusing on the transmission optical monitor 20) and the monitor node 2-4 (focusing on the reception optical monitor 40) having the above-described configurations illustrated in FIGS. 6 to 8 will be described with reference to FIGS. 9 to 13.

Figure 9:
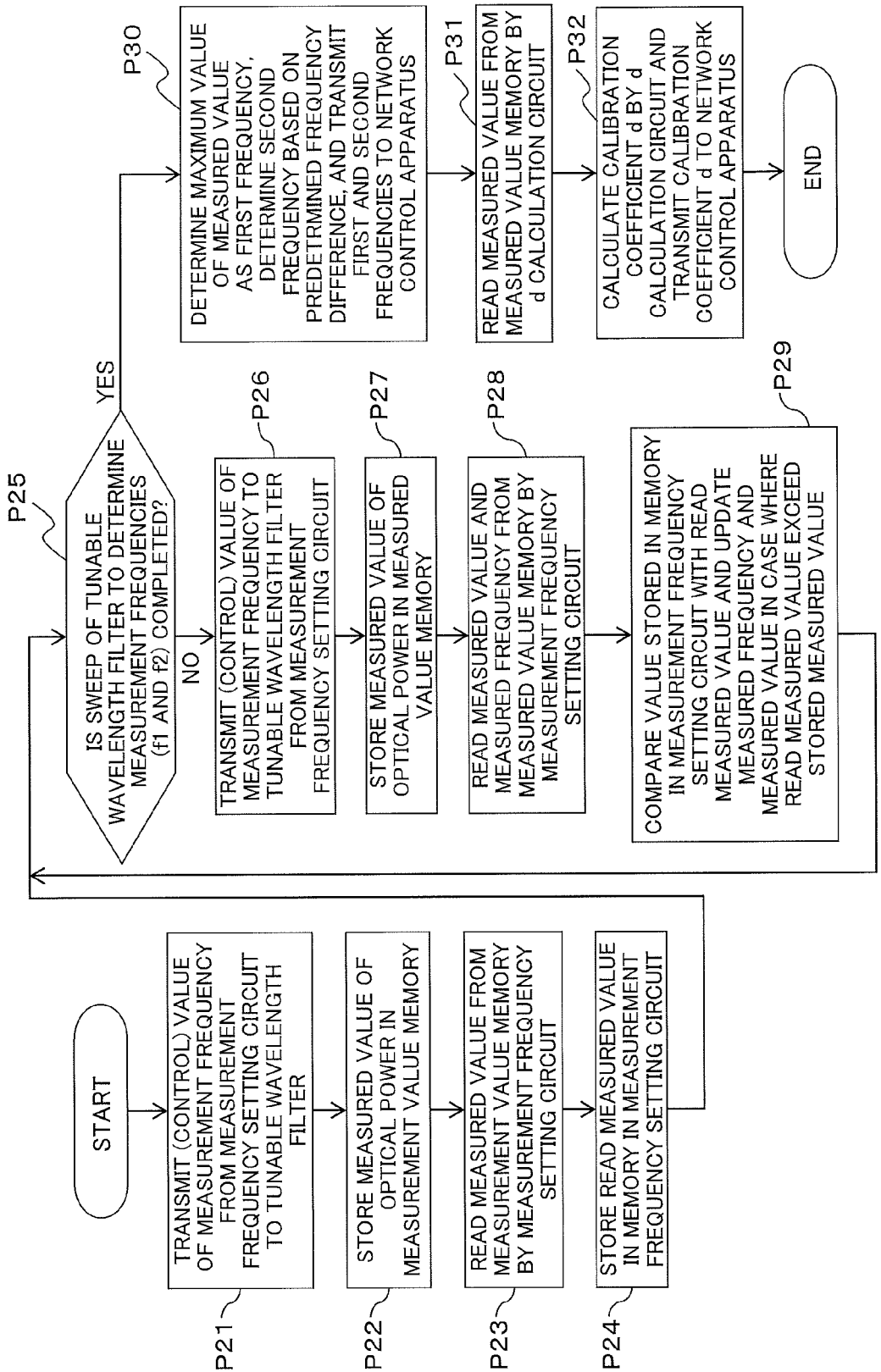
FIG. 9 is a flowchart that illustrates an example of operations performed in a process relating to setting of measurement target frequencies and acquisition of a calibration coefficient at the source node illustrated in FIGS. 4, 6, and 7.
Figure 10:
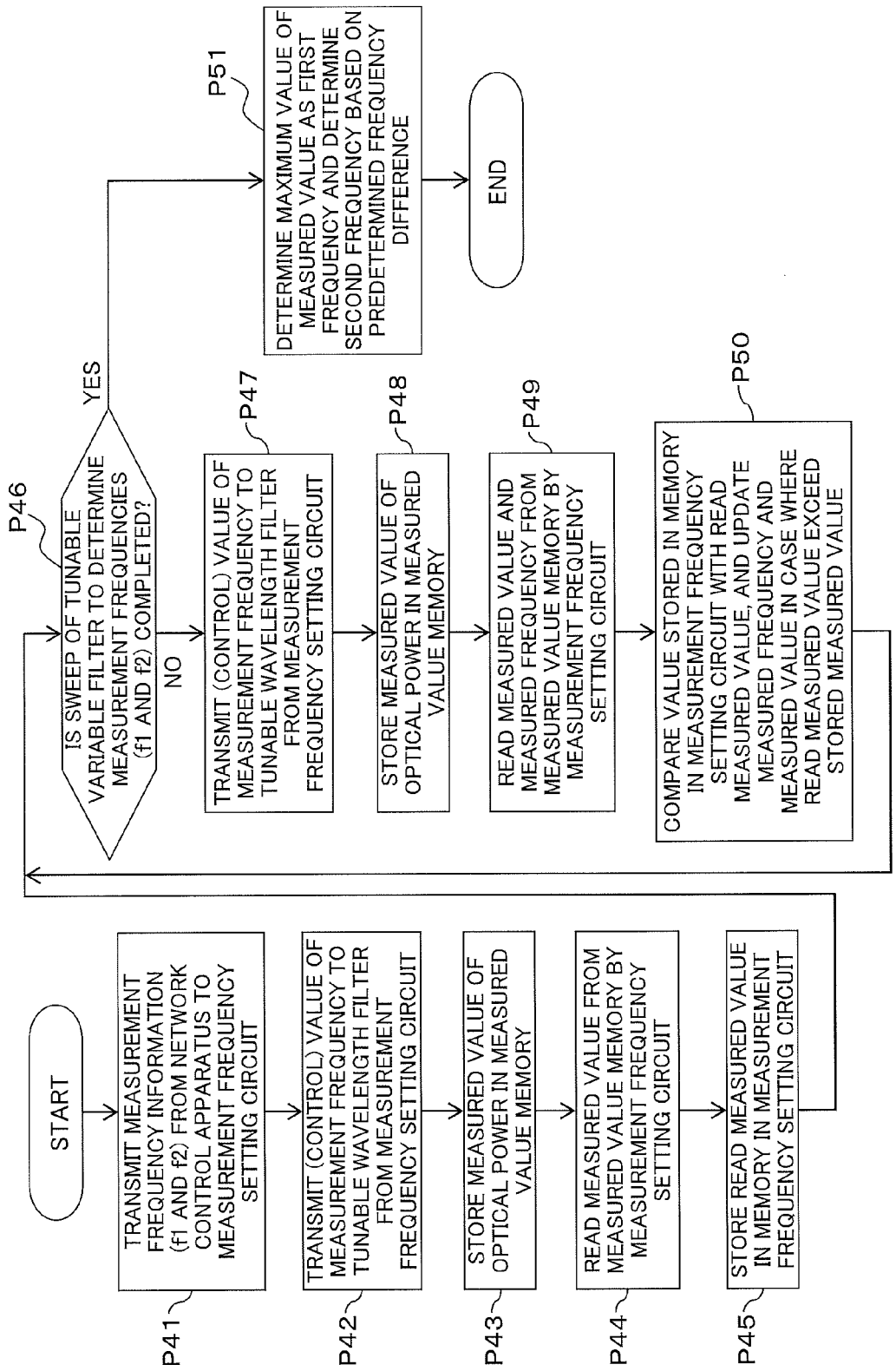
FIG. 10 is a flowchart that illustrates an example of operations performed in a process relating to setting and calibration of measurement target frequencies at the monitor node illustrated in FIG. 8.

FIG. 9 is a flowchart that illustrates an example of operations performed in a process relating to setting of measurement frequencies and acquisition of the calibration coefficient d at the source node 2-1. FIG. 10 is a flowchart that illustrates an example of operations performed in a process relating to setting and calibration of measurement frequencies at the monitor node 2-4.

Figure 11:
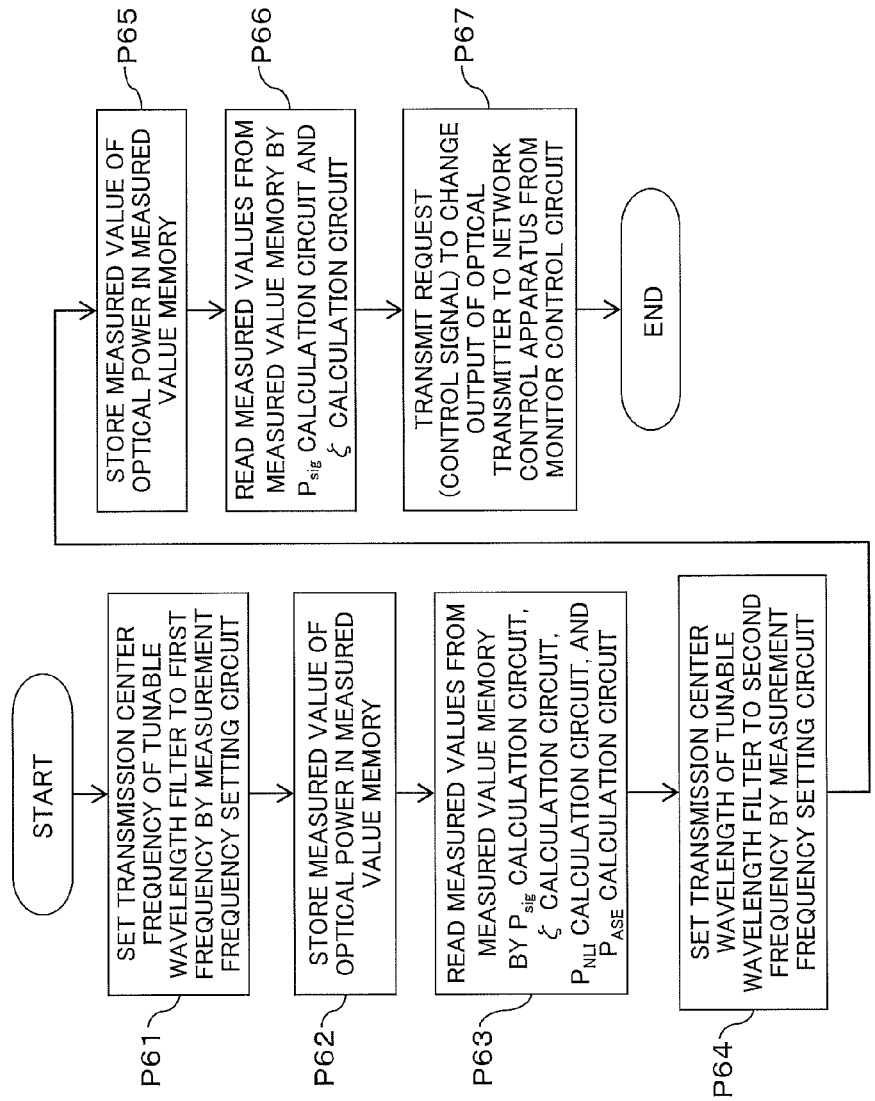
FIG. 11 is a flowchart that illustrates an example of operations in a measurement process at a first transmission optical power level performed at the monitor node illustrated in FIG. 8.
Figure 12:
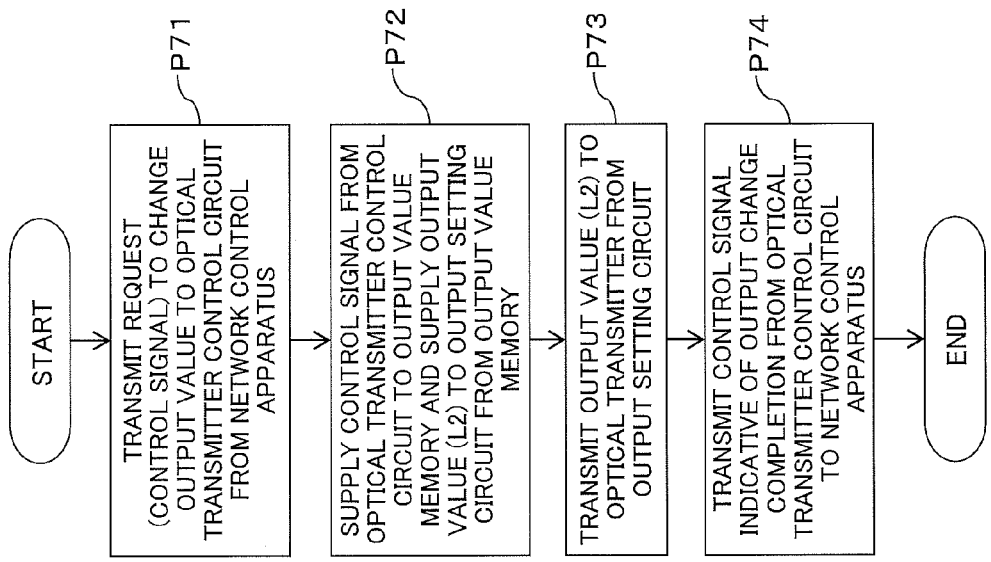
FIG. 12 is a flowchart that illustrates an example of operations performed in a process of changing transmission optical power at the source node illustrated in FIG. 6.
Figure 13:
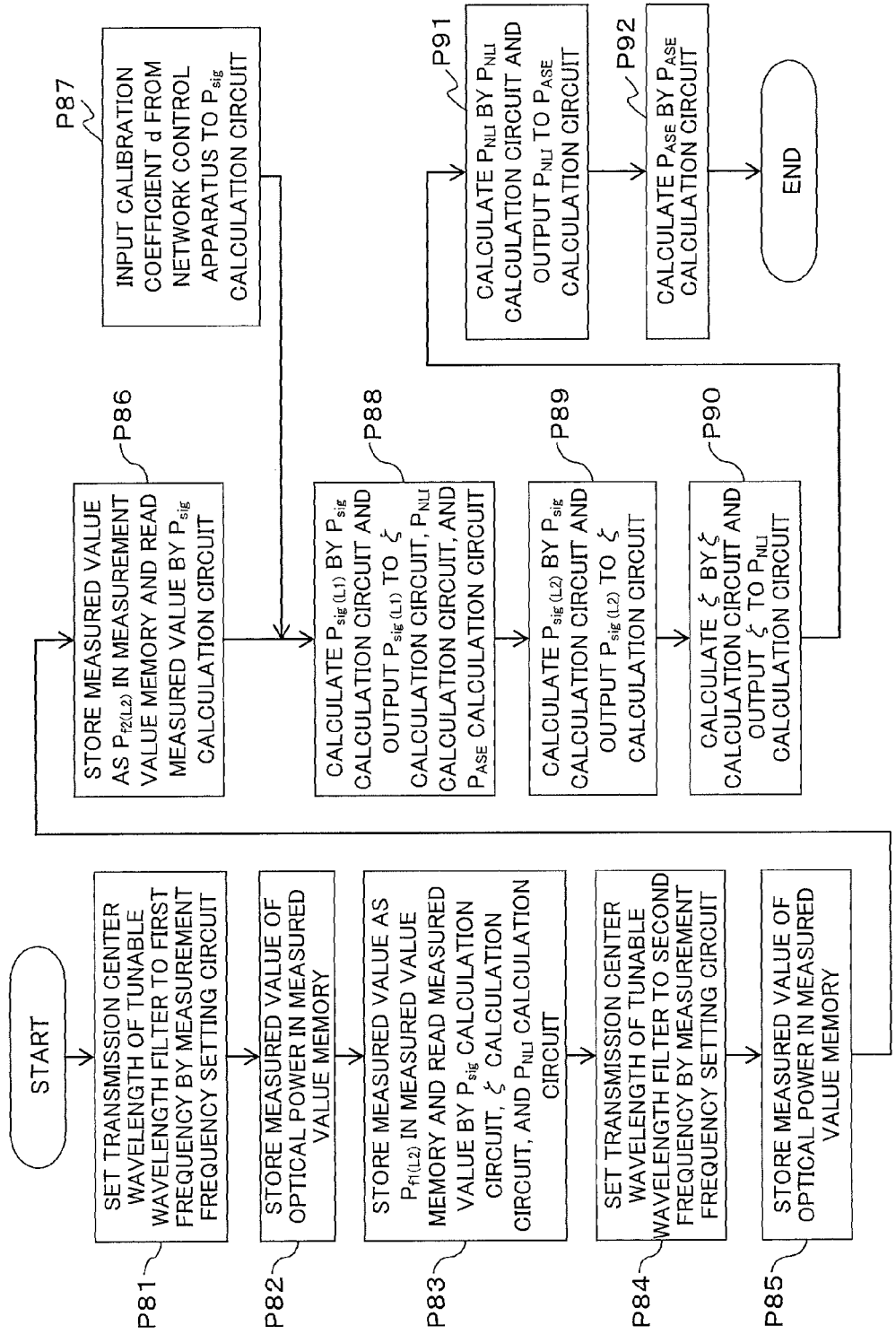
FIG. 13 is a flowchart that illustrates an example of operations performed in a measurement process at a second transmission optical power level at the monitor node illustrated in FIG. 8.

FIG. 11 is a flowchart that illustrates an example of operations in a measurement process at the first transmission optical power level performed in the monitor node 2-4. FIG. 12 is a flowchart that illustrates an example of operations performed in a transmission optical power change process at the source node 2-1. FIG. 13 is a flowchart that illustrates an example of operations performed in a measurement process at the second transmission optical power level in the monitor node 2-4.

(Setting Measurement Frequency at Source Node and Acquisition of Calibration Coefficient d)

First, as illustrated in FIG. 9, in the source node 2-1, the measurement frequency setting circuit 231 controls (or sets) the transmission frequency of the tunable wavelength filter 21 based on initial setting information of measurement frequency (process P21).

In this way, the transmission optical power level at the measurement frequency is measured by the optical power measure 22 (e.g., the PD 221 and the ADC 222), and a result of the measurement is stored in the measured value memory 233 (process P22). With regard to this, information indicative of the measurement frequency may be stored in the measured value memory 233 together with the result of the measurement. The stored result of the measurement is read by the measurement frequency setting circuit 231 (process P23) and may be stored in, for example, an internal memory (not illustrated) of the measurement frequency setting circuit 231 (process P24).

Subsequently, the measurement frequency setting circuit 231 checks whether or not sweeping of the tunable wavelength filter 21 to determine the measurement frequency (for example, f1 or f2) has been completed (process P25). In a case where the sweeping process has not been completed (No in process P25), the measurement frequency setting circuit 231 controls the transmission frequencies of the tunable wavelength filter 21 to frequency (for example, frequency different from the initial setting) that is based on a sweep setting (process P26).

Thereby, the transmission optical power level at the measurement frequency is measured by the optical power measure 22 (e.g., the PD 221 and the ADC 222), and a result of the measurement is stored in the measured value memory 233 (process P27). The stored result of the measurement is read by, for example, the measurement frequency setting circuit 231 together with the information of the measurement frequency (process P28).

The measurement frequency setting circuit 231 compares the measured value of the transmission optical power level of the measurement frequency, which are read from the measured value memory 233, with the measured value of the transmission optical power level at the different measurement frequency stored in the internal memory. As a result of the comparison, when the measured value read from the measured value memory 233 exceeds the measured value stored in the internal memory, the measured frequency and the measured value stored in the internal memory are updated with the information read from the measured value memory 233 (process P29).

The processes P26 to P29 described above may be repeatedly performed until the sweeping process is completed (until Yes is determined in process P25). As described above, while sweeping the transmission frequencies of the tunable wavelength filter 21 to measure the transmission optical power levels at the different frequencies, a frequency at which the measured value becomes maximum is searched.

In response to a completion of the sweep control for the tunable wavelength filter 21 (in case of Yes in process P25), the measurement frequency setting circuit 231 may determine the frequency at which the measured value of the transmission optical power level, which is stored in the internal memory, is maximum as the first measurement frequency (for example, f1 described above). In addition, the measurement frequency setting circuit 231 may determine a frequency shifted from the determined first measurement frequency (f1) by a predetermined frequency in the spectrum of the signal light as the second measurement frequency (for example, f2 described above). The determined information of the first and second measurement frequencies f1 and f2 is transmitted to, for example, the network control apparatus 3 (process P30).

After the process of determining the measurement frequencies described above or in parallel with the determining process, the measured values of the transmission optical power levels at the different measurement frequencies f1 and f2, which are stored in the measured value memory 233, may be read by the d calculation circuit 234 (process P31).

The d calculation circuit 234 calculates the calibration coefficient d according to the aforementioned Mathematical Formula 15 to transmit the calculated calibration coefficient d to, for example, the network control apparatus 3 (process P32).

In this way, the determination (or calibration) of the measurement frequencies and the calculation of the calibration coefficient d are performed in the transmission optical monitor 20.

(Setting Measurement Frequency at Monitor Node)

Next, as illustrated in FIG. 10, in the monitor node 2-4, the measurement frequency setting circuit 431 receives the setting information of the measurement frequencies (f1 and f2) from, for example, the network control apparatus 3 (process P41). In response to a reception of the setting information, the measurement frequency setting circuit 431 controls (or sets) the transmission frequency of the tunable wavelength filter 41 based on the setting information (process P42).

In this way, each reception optical power level at each measurement frequency is measured by the optical power measure 42 (e.g., the PD 421 and the ADC 422), and each result of the measurement is stored in the measured value memory 433 (process P43). With regard to this, information indicative of each measurement frequency may be stored in the measured value memory 433 together with each measurement result. The stored result of the measurement may be read by the measurement frequency setting circuit 431 (process P44) and may be stored in an internal memory (not illustrated) of the measurement frequency setting circuit 431 (process P45).

In order to calibrate the measurement frequencies (for examples, f1 and f2), the measurement frequency setting circuit 431 may perform, similar to the sweep control performed by the transmission optical monitor 20, a sweep control for the tunable wavelength filter 41.

In a case where the calibration (or sweep control) of measurement frequencies is performed, the measurement frequency setting circuit 431 checks whether or not the sweep control for the tunable wavelength filter 41 has been completed (process P46). In a case where the sweep control has not been completed (in case of No in process P46), the measurement frequency setting circuit 431 may control the transmission frequency of the tunable wavelength filter 41 to a frequency (for example, a frequency different from the frequency set in process P42) that are based on a sweep setting (process P47).

In this way, the reception optical power level at the measurement frequency is measured by the optical power measure 42 (e.g., the PD 421 and the ADC 422), and a result of the measurement is stored in the measured value memory 433 (process P48). The stored result of the measurement may be read by, for example, the measurement frequency setting circuit 431 together with the information indicative of measurement frequency (process P49).

The measurement frequency setting circuit 431 compares the measured value of the reception optical power level at the measurement frequency, which are read from the measured value memory 433, with the measured value of the reception optical power level at the different measurement frequency stored in the internal memory. As a result of the comparison, in a case where the measured value read from the measured value memory 433 exceeds the measured value stored in the internal memory, the measured frequency and the measured value stored in the internal memory are updated with the information read from the measured value memory 433 (process P50).

The processes P47 to P50 described above may be repeatedly performed until the sweeping process is completed (until Yes is determined in process P46). As described above, while sweeping the transmission frequencies of the tunable wavelength filter 41 to measure the transmission optical power levels at the different frequencies, a frequency at which the measured value becomes maximum is searched.

In response to a completion of the sweep control for the tunable wavelength filter 41 (in case of Yes in process P46), the measurement frequency setting circuit 431 may determine (or calibrate) the frequency at which the measured value of the reception optical power level, which is stored in the internal memory, is maximum as the first measurement frequency (for example, f1 described above). In addition, the measurement frequency setting circuit 431 may determine (or calibrate) a frequency shifted from the determined first measurement frequency (f1) by a predetermined frequency in the spectrum of the signal light as the second measurement frequency (for example, f2 described above) (process P51).

As described above, the determination (or calibration) of measurement frequencies is performed in the reception optical monitor 40. By determining the frequency at which the optical power level measured by the optical power measure 42 is maximum according to the sweep control of the tunable wavelength filter 41 as the first (measurement) frequency, the sensitivity of the power monitor can be improved. In addition, by determining the frequency shifted from the first measurement frequency by a predetermined frequency as the second measurement frequency, the monitor control process can be simplified.

(Monitoring at First Transmission Optical Power Level)

As described above, in response to the determination of the first and second measurement frequencies in the monitor node 2-4 (e.g., the measurement frequency setting circuit 431), the measurement frequency setting circuit 431 sets, as exemplarily illustrated in FIG. 11, the transmission frequency of the tunable wavelength filter 41 to the first measurement frequency (for example, f1) (process P61).

In this way, the reception optical power level at the measurement frequency f1 is measured by the optical power measure 42 (e.g., the PD 421 and the ADC 422), and a result of the measurement is stored in the measured value memory 433 (process P62). The result of the measurement may be stored in the measured value memory 433 as the measured value $P_{f1(L1)}$ of the first measurement frequency f1 at the first transmission optical power level (L1).

The stored measured value $P_{f1(L1)}$ may be read by the $P_{sig}$ calculation circuit 434, the $\zeta$ calculation circuit 435, the $P_{NLI}$ calculation circuit 436, and the $P_{ASE}$ calculation circuit 437 (process P63).

Subsequently, the measurement frequency setting circuit 431 may set the transmission frequency of the tunable wavelength filter 41 to a second measurement frequency (for example, f2) (process P64).

In this way, the reception optical power level of the measurement frequency f2 is measured by the optical power measure 42 (e.g., the PD 421 and the ADC 422), and a result of the measurement is stored in the measured value memory 433 (process P65). The result of the measurement may be stored in the measured value memory 433 as the measured value $P_{f2(L1)}$ of the second measurement frequency f2 at the first transmission optical power level L1.

The stored measured value $P_{f2(L1)}$ may be read by the $P_{sig}$ calculation circuit 434 and the $\zeta$ calculation circuit 435 (process P66).

Subsequently, the monitor control circuit 432 may transmit a request to change the output optical power level of the optical transmitter 24 in the source node 2-1 to the network control apparatus 3, for example, by using a control signal (process P67).

(Process of Changing Transmission Optical Power)

In response to a reception of the above-described request to change the output optical power level, the network control apparatus 3 may transmit, as illustrated in FIG. 12, a request to change the output value to the optical transmitter control circuit 271 (see FIG. 6) in the source node 2-1 by using a control signal (process P71).

The optical transmitter control circuit 271 stores in the output value memory 272 the output value (for example, a value corresponding to the second transmission optical power level L2) indicated in the received control signal (process P72). The output value stored in the output value memory 272 may be read by the output setting circuit 273. The output setting circuit 273 gives the read output value to the optical transmitter 24 to set the output optical power level of the optical transmitter 24 to the level L2 (process P73).

Meanwhile, the optical transmitter control circuit 271 may transmit information indicative of the completion of the changing of the output optical power level of the optical transmitter 24 to the network control apparatus 3 by using a control signal (process P74).

(Monitoring at Second Transmission Optical Power Level)

As described above, after the transmission optical power level of the source node 2-1 is changed from the level L1 to the level L2, the monitor node 2-4 may perform a monitor process similar to the monitor process illustrated in FIG. 11.

For example, as illustrated in FIG. 13, the measurement frequency setting circuit 431 of the monitor node 2-4 sets the transmission frequency of the tunable wavelength filter 41 to the first measurement frequency (for example, f1) (process P81).

In this way, the reception optical power level of the measurement frequency f1 is measured by the optical power measure 42 (e.g., the PD 421 and the ADC 422), and a result of the measurement is stored in the measured value memory 433 (process P82). The result of the measurement may be stored in the measured value memory 433 as the measured value $P_{f1(L2)}$ of the first measurement frequency f1 at the second transmission optical power level (L2).

The stored measured value $P_{f1(L2)}$ may be read by the $P_{sig}$ calculation circuit 434, the $\zeta$ calculation circuit 435, the $P_{NLI}$ calculation circuit 436, and the $P_{ASE}$ calculation circuit 437 (process P83).

Subsequently, the measurement frequency setting circuit 431 may set the transmission frequency of the tunable wavelength filter 41 to a second measurement frequency (for example, f2) (process P84).

In this way, the reception optical power level of the measurement frequency f2 is measured by the optical power measure 42 (e.g., the PD 421 and the ADC 422), and a result of the measurement is stored in the measured value memory 433 (process P85). The result of the measurement may be stored in the measured value memory 433 as the measured value $P_{f2(L2)}$ of the second measurement frequency f2 at the second transmission optical power level L2.

The stored measured value $P_{f2(L2)}$ may be read by the $P_{sig}$ calculation circuit 434 (process P86). In addition, the calibration coefficient d is input to the $P_{sig}$ calculation circuit 434 from, for example, the network control apparatus 3 (process P87).

The $P_{sig}$ calculation circuit 434 calculates the signal light component power level $P_{sig\ (L1)}$ according to the aforementioned Mathematical Formula 8 and outputs a result of the calculation to the $\zeta$ calculation circuit 435, the $P_{NLI}$ calculation circuit 436, and the $P_{ASE}$ calculation circuit 437 (process P88).

Further, the $P_{sig}$ calculation circuit 434 calculates the signal light component power level $P_{sig\ (L2)}$ according to the aforementioned Mathematical Formula 9 and outputs a result of the calculation to the $\zeta$ calculation circuit 435 in process P89. Here, the process P88 and the process P89 may be performed in parallel.

The $\zeta$ calculation circuit 435 calculates the proportionality coefficient $\zeta$ according to the aforementioned Mathematical Formula 12 and outputs the calculated proportionality coefficient $\zeta$ to the $P_{NLI}$ calculation circuit 436 (process P90).

The $P_{NLI}$ calculation circuit 436 calculates the NLI noise component power level $P_{NLI}$ according to the aforementioned Mathematical Formula 21 and outputs the calculated NLI noise component power level $P_{NLI}$ to the $P_{ASE}$ calculation circuit 437 (process P91).

The $P_{ASE}$ calculation circuit 437 calculates the ASE noise component power level $P_{ASE}$ according to the aforementioned Mathematical Formula 22 (process P92).

As described above, the transmission signal light power level ($P_{rig}$) is changed (or varied) in different power levels at the source node 2-1, and the proportionality coefficient $\zeta$ is calculated according to Mathematical Formula 12 based on the different reception signal light power levels that are monitored by the monitor node 2-4. Then, the NLI noise component power level ($P_{NLI}$) and the ASE noise component power level ($P_{ASE}$) can be individually obtained by Mathematical Formulas 21 and 22 based on the calculated proportionality coefficient $\zeta$.

Since the NLI noise component power level ($P_{NLI}$) and the ASE noise component power level ($P_{ASE}$) can be individually obtained, it is possible to obtain the OSNR of the received signal light accurately in accordance with the aforementioned Mathematical Formula 23.

In the above-described embodiment, as illustrated in FIG. 3, it is assumed that the ASE noise component in the optical spectrum of the measurement wavelength may be considered as being constant or substantially constant (in other words, the variation may be ignored).

The ASE noise component can be constant by controlling (or setting) optical transmission parameters to be constant. The optical transmission parameters may include an amplification gain of an optical amplifier and an optical attenuation rate due to an insertion loss of a wavelength selection switch (WSS). The WSS may be applied to a relay node provided between the source node 2-1 and the monitor node 2-4.

Figure 14:
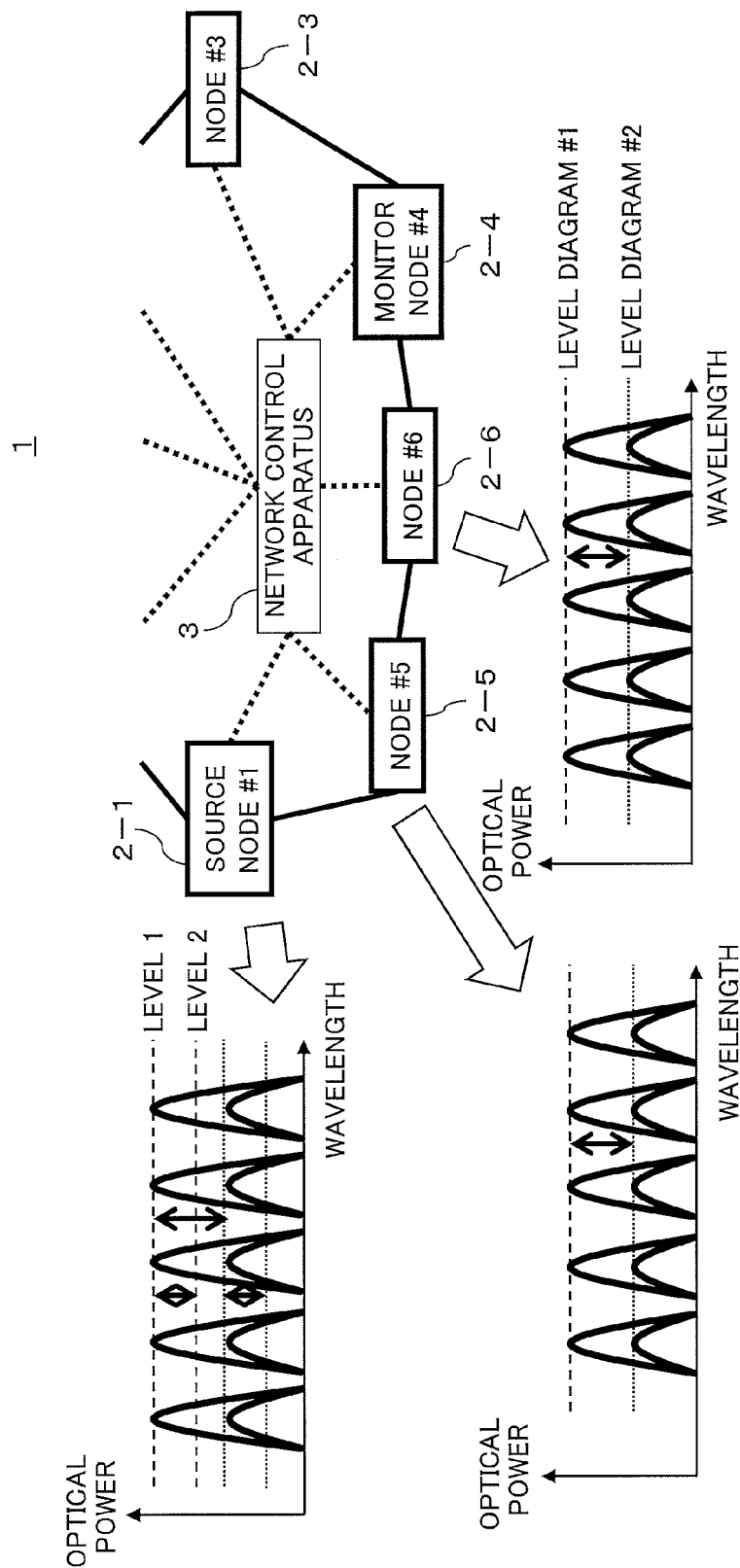
FIG. 14 is a diagram that illustrates an exemplary level diagram of optical transmission between the source node and the monitor node illustrated in FIG. 1.

For example, as schematically illustrated in FIG. 14, it is assumed that two relay nodes 2-5 and 2-6 are provided between the source node 2-1 and the monitor node 2-4. However, the number of relay nodes may be one, or three or more. In the example illustrated in FIG. 14, by controlling (or setting) the amplification gain of the optical amplifier and the optical attenuation rate due to an insertion loss of the WSS to be constant in the relay nodes 2-5 and 2-6, it is possible to fix the level diagram of a signal light in the relay spans.

In a case where the level diagram is changed, the above-described embodiment may be applied to the changed level diagram. For example, after the setting of the level diagram, while maintaining the amplification gain and the optical attenuation rate due to an insertion loss of the WSS and the like in the relay nodes 2-5 and 2-6, the change of the transmission signal light power level at the source node 2-1 and the monitoring of the reception optical power level at the monitor node 2-4 may be performed.

Figure 15A:
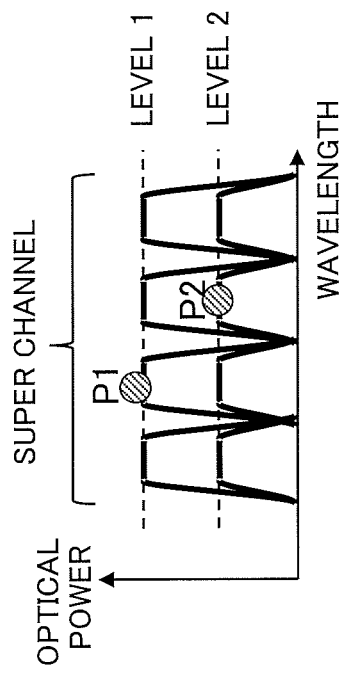
FIG. 15A is a diagram illustrating that measurement target wavelengths are the same in the optical transmission system illustrated in FIG. 1.
Figure 15B:
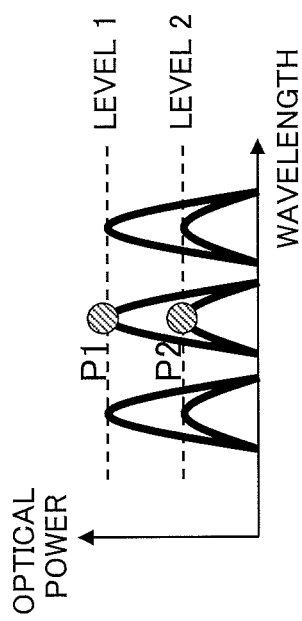
FIG. 15B is a diagram illustrating that measurement target wavelengths are different wavelengths in a super channel in the optical transmission system illustrated in FIG. 1.

In addition, in the above-described embodiment, as illustrated in FIGS. 2, 3, and 15A, the different power levels of signal lights having the same wavelength are monitored. However, as illustrated in FIG. 15B, different power levels of signal lights having different wavelengths may be monitored.

For example, since a wavelength group forming a super channel may be considered as being transmitted in the same transmission line condition, there is a case where the ASE noise component and the proportionality coefficient may also be considered as being the same for each wavelength. In such a case, the calibration coefficient d, the proportionality coefficient ζ, the signal light power ($P_{sig}$), the NLI noise component power level ($P_{NLI}$), and the ASE noise component power level ($P_{ASE}$) may also be calculated by using the calculation formulas and the calculation methods described above.

According to the technology described above, it is possible to obtain or calculate a non-linear noise component and a spontaneous emission noise component with respect to a signal light with a simple and easy configuration at low cost.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A measurement apparatus of measuring signal light quality, the apparatus comprising:
    a tunable wavelength filter configured to receive signal lights having different power levels;
    a measure configured to measure an optical power level of light passing through the tunable wavelength filter; and
    a controller configured to calculate a non-linear noise power and an amplified spontaneous emission power of a signal light based on the measured optical powers,
    wherein each of the optical powers:
        is measured at different transmission frequencies of the tunable wavelength filter for each of the signal lights having the different power in response to a control of the transmission frequency of the tunable wavelength filter, and
        includes a power of a signal light component, the non-linear noise power and the amplified spontaneous emission power.

2. The measurement apparatus according to claim 1, wherein the controller is configured to sweep the transmission frequencies and to determine a first frequency being one of the different transmission frequencies, the first frequency corresponding to a frequency at which the optical power level measured by the measure is maximal in response to the sweep.

3. The measurement apparatus according to claim 2, wherein the controller is configured to determine a second frequency shifted from the first frequency by a predetermined frequency in a spectrum of the signal light.

4. The measurement apparatus according to claim 1, wherein wavelengths of the signal lights having the different power levels are identical.

5. The measurement apparatus according to claim 1, wherein wavelengths of the signal lights having the different power levels are different, and the signal lights with the different wavelengths form a super channel.

6. A measurement method of measuring signal light quality, the method comprising:
    controlling a transmission frequency of a tunable wavelength filter to be input with signal lights having different power levels;
    measuring, in response to the controlling, power levels of light at different transmission frequencies for each of the signal lights having the different power levels; and
    calculating a non-linear noise power and an amplified spontaneous emission power of a signal light based on the measured optical powers,
    wherein each of the optical powers:
        is measured at different transmission frequencies of the tunable wavelength filter for each of the signal lights having the different power in response to a control of the transmission frequency of the tunable wavelength filter, and
        includes a power of a signal light component, the non-linear noise power and the amplified spontaneous emission power.

* * * * *